United States Patent
Haviv et al.

(10) Patent No.: US 10,157,049 B2
(45) Date of Patent: Dec. 18, 2018

(54) STATIC ANALYSIS WITH INPUT REDUCTION

(75) Inventors: Yinnon A. Haviv, Beerotaim (IL); Daniel Kalman, Herzliya (IL); Dmitri Pikus, Haifa (IL); Omer Tripp, Herzliya (IL); Omri Weisman, Herzliya (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1791 days.

(21) Appl. No.: 13/281,653

(22) Filed: Oct. 26, 2011

(65) Prior Publication Data
US 2013/0111449 A1    May 2, 2013

(51) Int. Cl.
| | |
|---|---|
| G06F 9/44 | (2018.01) |
| G06F 8/41 | (2018.01) |
| G06F 11/36 | (2006.01) |
| G06F 8/75 | (2018.01) |

(52) U.S. Cl.
CPC .......... *G06F 8/443* (2013.01); *G06F 11/3604* (2013.01); *G06F 8/75* (2013.01)

(58) Field of Classification Search
CPC .................. G06F 11/3604; G06F 11/3608
See application file for complete search history.

(56) References Cited

U.S. PATENT DOCUMENTS

| | | | | |
|---|---|---|---|---|
| 5,832,271 A * | 11/1998 | Devanbu | ............. | G06F 11/3612 717/131 |
| 7,284,274 B1 * | 10/2007 | Walls | ......................... | G06F 8/70 726/25 |
| 7,340,726 B1 * | 3/2008 | Chelf | ......................... | G06F 8/71 714/38.12 |
| 7,434,202 B2 * | 10/2008 | Kramer | ..................... | G06F 8/71 717/102 |
| 7,467,376 B2 | 12/2008 | Le Metayer et al. | | |
| 7,685,471 B2 | 3/2010 | Rajan et al. | | |
| 8,234,627 B2 * | 7/2012 | Floyd | ..................... | G06Q 30/02 717/115 |
| 8,370,938 B1 * | 2/2013 | Daswani | ............... | G06F 21/562 726/23 |
| 8,516,590 B1 * | 8/2013 | Ranadive | ........... | H04L 63/1433 713/187 |

(Continued)

FOREIGN PATENT DOCUMENTS

CN        102231134 A   * 11/2011

OTHER PUBLICATIONS

Kinn,Byung-Ik, Chae-Tae Im, and Hyun-Chul Jung. "Suspicious malicious web site detection with strength analysis of a javascript obfuscation." International Journal of Advanced Science and Technology 26 (2011): 19-32. (Year: 2011).*

(Continued)

*Primary Examiner* — Matthew J Brophy
(74) *Attorney, Agent, or Firm* — Cuenot, Forsythe & Kim, LLC (57) ABSTRACT

Statically analyzing a computer software application can include identifying a plurality of objects within the instructions of a computer software application, where the objects in the plurality of objects are of the same object type, and preparing a modified version of the instructions in which any of the objects in the plurality of objects determined to be extraneous is omitted.

18 Claims, 6 Drawing Sheets

(56) References Cited

U.S. PATENT DOCUMENTS

| | | | | |
|---|---|---|---|---|
| 8,555,391 | B1* | 10/2013 | Demir | H04L 67/20 |
| | | | | 713/187 |
| 8,683,584 | B1* | 3/2014 | Daswani | G06F 21/577 |
| | | | | 726/22 |
| 8,850,405 | B2* | 9/2014 | Fink | G06F 8/77 |
| | | | | 717/131 |
| 8,903,702 | B2* | 12/2014 | Artzi | G06F 8/75 |
| | | | | 703/22 |
| 9,154,364 | B1* | 10/2015 | Daswani | G06F 21/562 |
| 2004/0168152 | A1* | 8/2004 | Kramer | G06F 8/71 |
| | | | | 717/120 |
| 2006/0150160 | A1* | 7/2006 | Taft | G06F 11/3604 |
| | | | | 717/126 |
| 2007/0016894 | A1* | 1/2007 | Sreedhar | G06F 8/43 |
| | | | | 717/131 |
| 2007/0107057 | A1* | 5/2007 | Chander | G06F 21/54 |
| | | | | 726/22 |
| 2007/0226281 | A1* | 9/2007 | Joisha | G06F 8/443 |
| 2007/0288899 | A1* | 12/2007 | Fanning | G06F 8/75 |
| | | | | 717/124 |
| 2008/0098361 | A1* | 4/2008 | Kumar | G06F 11/3684 |
| | | | | 717/128 |
| 2008/0155511 | A1* | 6/2008 | Cohen | G06F 8/75 |
| | | | | 717/131 |
| 2008/0189686 | A1* | 8/2008 | Rajan | G06F 11/3608 |
| | | | | 717/125 |
| 2008/0300851 | A1* | 12/2008 | Chakrabarti | G06F 8/433 |
| | | | | 703/22 |
| 2009/0132991 | A1* | 5/2009 | Ganai | G06F 17/504 |
| | | | | 716/104 |
| 2009/0204968 | A1* | 8/2009 | Kahlon | G06F 11/30 |
| | | | | 718/100 |
| 2009/0282288 | A1* | 11/2009 | Wang | G06F 11/3612 |
| | | | | 714/37 |
| 2010/0058256 | A1* | 3/2010 | El-Zein | G06F 17/505 |
| | | | | 716/132 |
| 2010/0088678 | A1* | 4/2010 | AlTurki | G06F 8/10 |
| | | | | 717/124 |
| 2010/0257603 | A1* | 10/2010 | Chander | G06F 21/54 |
| | | | | 726/22 |
| 2011/0138373 | A1* | 6/2011 | Lane | G06F 8/443 |
| | | | | 717/157 |
| 2011/0307954 | A1* | 12/2011 | Melnik | H04L 63/0227 |
| | | | | 726/22 |
| 2011/0314091 | A1* | 12/2011 | Podjarny | G06F 17/30905 |
| | | | | 709/203 |
| 2012/0030661 | A1* | 2/2012 | Porras | G06F 9/45525 |
| | | | | 717/153 |
| 2012/0072887 | A1* | 3/2012 | Basak | G06F 11/323 |
| | | | | 717/123 |
| 2012/0102471 | A1* | 4/2012 | Artzi | G06F 8/30 |
| | | | | 717/133 |
| 2012/0204163 | A1* | 8/2012 | Marathe | G06F 8/4442 |
| | | | | 717/151 |
| 2012/0216177 | A1* | 8/2012 | Fink | G06F 8/75 |
| | | | | 717/131 |
| 2013/0054221 | A1* | 2/2013 | Artzi | G06F 17/30 |
| | | | | 703/22 |

OTHER PUBLICATIONS

Devanbu, Premkumar T. "GENOA: a customizable language-and front-end independent code analyzer." Proceedings of the 14th international conference on Software engineering. ACM, 1992. (Year: 1992).*

Liang, D., et al., "Equivalence Analysis and its Application in Improving the Efficiency of Program Slicing," ACM Transactions on Software Engineering and Methodology, vol. 11, No. 3, pp. 347-383, 2002.

* cited by examiner

Fig. 2

```html
<html xmlns="http://www.w3.org/1999/xhtml" xml:lang="en" >
<body style="margin-top:5px;">
<script type="text/javascript">
<!--
var theForm = document.forms['aspnetForm'];
if (!theForm) {
   theForm = document.aspnetForm;
}
function __doPostBack(eventTarget, eventArgument) {
   if (!theForm.onsubmit || (theForm.onsubmit() != false)) {
      theForm.__EVENTTARGET.value = eventTarget;
      theForm.__EVENTARGUMENT.value = eventArgument;
      theForm.submit();
   }
}
<table cellspacing="0" cellpadding="3" rules="all" border="1"
id="_ctl0__ctl0_Content_Main_MyTransactions" style="width:100%;border-
collapse:collapse;">
      <tr style="color:White;background-color:#BFD7DA;font-weight:bold;">
         <td>TransactionID</td><td>AccountId</td><td>Description</td><td>Amount</td>
      </tr><tr>
            <td>6755</td><td>1001160140</td><td>Balance Deposit</td><td
align="right">1234</td>
         </tr><tr style="background-color:Gainsboro;">
            <td>6754</td><td>1001160141</td><td>Balance Withdrawal</td><td
align="right">1234</td>
         </tr><tr>
            <td>6753</td><td>1001160140</td><td>Balance Deposit</td><td
align="right">4294967297</td>
         </tr><tr style="background-color:Gainsboro;">
            <td>6752</td><td>1001160141</td><td>Balance Withdrawal</td><td
align="right">4294967297</td>
         </tr><tr>
            <td>6751</td><td>1001160140</td><td>Balance Deposit</td><td
align="right">99999999</td>
         </tr><tr style="background-color:Gainsboro;">
            <td>6750</td><td>1001160141</td><td>Balance Withdrawal</td><td
align="right">99999999</td>
         </tr><tr>
            <td>6737</td><td>1001160141</td><td>Balance Deposit</td><td
align="right">4294967297</td>

```
<!--Continued from Fig. 3A-->

</tr><tr style="background-color:Gainsboro;">
        <td>6736</td><td>1001160141</td><td>Balance Withdrawal</td><td align="right">4294967297</td>
    </tr><tr>
        <td>6735</td><td>1001160141</td><td>Balance Deposit</td><td align="right">99999999</td>
    </tr><tr style="background-color:Gainsboro;">
        <td>6706</td><td>1001160141</td><td>Balance Withdrawal</td><td align="right">1234</td>
    </tr><tr>
        <td colspan="4"><span>1</span> <a href="javascript:__doPostBack('_ctl0$_ctl0$Content$Main$MyTransactions$_ctl54$_ctl1',")">2</a> <a href="javascript:__doPostBack('_ctl0$_ctl0$Content$Main$MyTransactions$_ctl54$_ctl2',")">3</a> <a href="javascript:__doPostBack('_ctl0$_ctl0$Content$Main$MyTransactions$_ctl54$_ctl3',")">4</a> <a href="javascript:__doPostBack('_ctl0$_ctl0$Content$Main$MyTransactions$_ctl54$_ctl4',")">5</a> <a href="javascript:__doPostBack('_ctl0$_ctl0$Content$Main$MyTransactions$_ctl54$_ctl5',")">6</a> <a href="javascript:__doPostBack('_ctl0$_ctl0$Content$Main$MyTransactions$_ctl54$_ctl6',")">7</a> <a href="javascript:__doPostBack('_ctl0$_ctl0$Content$Main$MyTransactions$_ctl54$_ctl7',")">8</a> <a href="javascript:__doPostBack('_ctl0$_ctl0$Content$Main$MyTransactions$_ctl54$_ctl8',")">9</a> <a href="javascript:__doPostBack('_ctl0$_ctl0$Content$Main$MyTransactions$_ctl54$_ctl9',")">10</a> <a href="javascript:__doPostBack('_ctl0$_ctl0$Content$Main$MyTransactions$_ctl54$_ctl10',")">...</a></td>
    </tr>
</table>
</body>
</html>
```

Fig. 3B

```html
<html xmlns="http://www.w3.org/1999/xhtml" xml:lang="en" >
<body style="margin-top:5px;">
<script type="text/javascript">
<!--
var theForm = document.forms['aspnetForm'];
if (!theForm) {
   theForm = document.aspnetForm;
}
function __doPostBack(eventTarget, eventArgument) {
   if (!theForm.onsubmit || (theForm.onsubmit() != false)) {
      theForm.__EVENTTARGET.value = eventTarget;
      theForm.__EVENTARGUMENT.value = eventArgument;
      theForm.submit();
   }
}
<table cellspacing="0" cellpadding="3" rules="all" border="1"
id="_ctl0__ctl0_Content_Main_MyTransactions" style="width:100%;border-
collapse:collapse;">
      <tr style="color:White;background-color:#BFD7DA;font-weight:bold;">
         <td>TransactionID</td><td>AccountId</td><td>Description</td><td>Amount</td>
      </tr><tr>
            <td colspan="4"><span>1</span> <a
href="javascript:__doPostBack('_ctl0$_ctl0$Content$Main$MyTransactions$_ctl54$_ctl1'
,'')">2</a> <a
href="javascript:__doPostBack('_ctl0$_ctl0$Content$Main$MyTransactions$_ctl54$_ctl2'
,'')">3</a> <a
href="javascript:__doPostBack('_ctl0$_ctl0$Content$Main$MyTransactions$_ctl54$_ctl3'
,'')">4</a> <a
href="javascript:__doPostBack('_ctl0$_ctl0$Content$Main$MyTransactions$_ctl54$_ctl4'
,'')">5</a> <a
href="javascript:__doPostBack('_ctl0$_ctl0$Content$Main$MyTransactions$_ctl54$_ctl5'
,'')">6</a> <a
href="javascript:__doPostBack('_ctl0$_ctl0$Content$Main$MyTransactions$_ctl54$_ctl6'
,'')">7</a> <a
href="javascript:__doPostBack('_ctl0$_ctl0$Content$Main$MyTransactions$_ctl54$_ctl7'
,'')">8</a> <a
href="javascript:__doPostBack('_ctl0$_ctl0$Content$Main$MyTransactions$_ctl54$_ctl8'
,'')">9</a> <a
href="javascript:__doPostBack('_ctl0$_ctl0$Content$Main$MyTransactions$_ctl54$_ctl9'
,'')">10</a> <a
href="javascript:__doPostBack('_ctl0$_ctl0$Content$Main$MyTransactions$_ctl54$_ctl1
0','')">...</a></td>
         </tr>
</table>
</body>
</html>
```

Fig. 4

STATIC ANALYSIS WITH INPUT REDUCTION

FIELD OF THE INVENTION

One or more embodiments of the invention relate to computer software analysis and testing in general.

BACKGROUND

One of the challenges encountered by designers of static analysis engines is designing static analysis engines that are able to analyze large computer software applications. Typically when performing static analysis of a computer software application, a model representation is built of the application. The model is then analyzed in accordance with a specification. Unfortunately, some applications are so large and complex, that just translating them from their initial state (e.g., source code or object code) and into an analyzable artifact presents difficult challenges. Furthermore, the larger the application, the larger the model, the greater the complexity and processing requirements when analyzing the model, and the greater the chance the capacity of the static analysis engine will be exceeded.

BRIEF SUMMARY

In one aspect of the invention a method is provided for statically analyzing a computer software application. The method can include identifying a plurality of objects within the instructions of a computer software application, where the objects in the plurality of objects are of the same object type, and preparing a modified version of the instructions in which any of the objects in the plurality of objects determined to be extraneous is omitted.

Systems and computer-program products embodying the operations and functions disclosed within this specification are also provided.

BRIEF DESCRIPTION OF THE SEVERAL VIEWS OF THE DRAWINGS

The invention will be understood and appreciated more fully from the following detailed description taken in conjunction with the appended drawings in which:

FIGS. 3A and 3B, taken together, is a simplified listing of HTML and JavaScript™ instructions of an exemplary computer software application before application of the method of FIG. 2;

FIG. 4 is a simplified listing of the instructions of FIGS. 3A and 3B after the application of the method of FIG. 2.

DETAILED DESCRIPTION

The invention is now described within the context of one or more embodiments, although the description is intended to be illustrative of the invention as a whole, and is not to be construed as limiting the invention to the embodiments shown. It is appreciated that various modifications may occur to those skilled in the art that, while not specifically shown herein, are nevertheless within the true spirit and scope of the invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
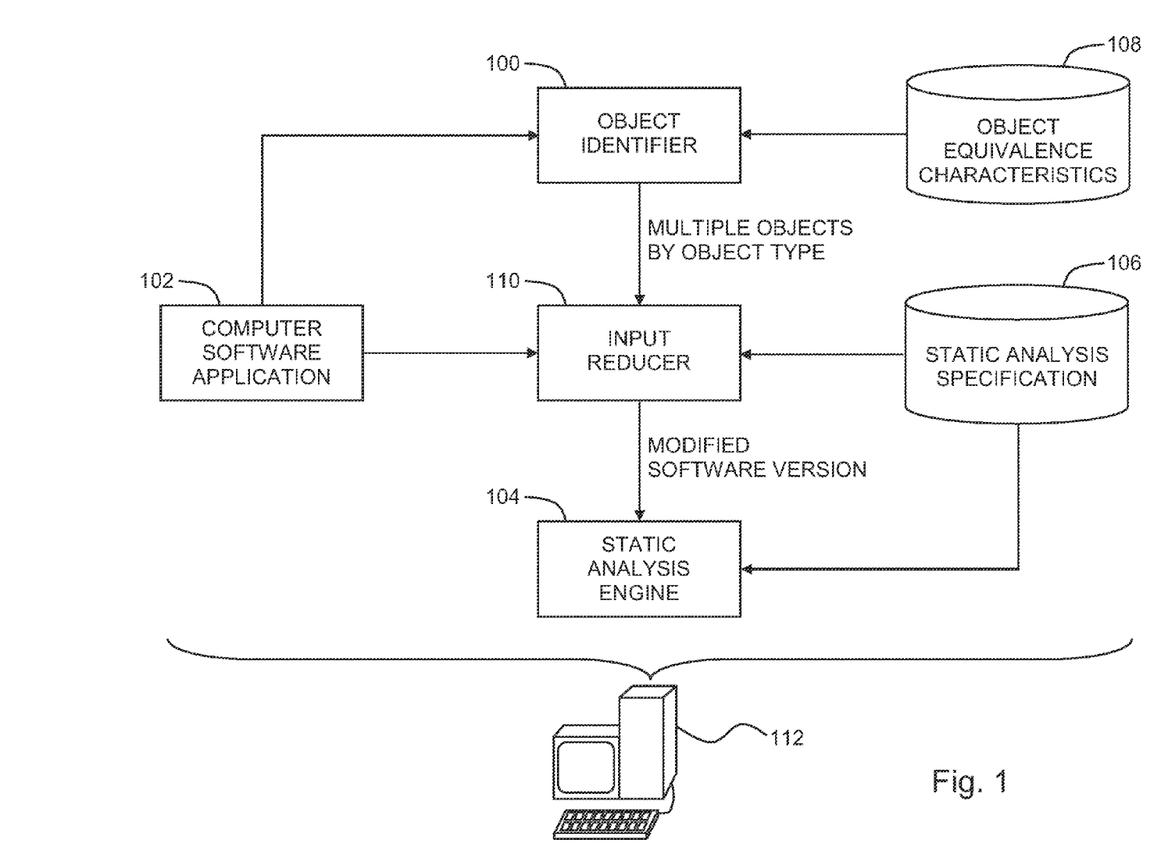
FIG. 1 is a simplified conceptual illustration of a system for static analysis with input reduction, constructed and operative in accordance with an embodiment of the invention.

Reference is now made to FIG. 1, which is a simplified conceptual illustration of a system for static analysis with input reduction, constructed and operative in accordance with an embodiment of the invention. In the system of FIG. 1, an object identifier 100 is preferably configured to identify multiple objects within the instructions of a computer software application 102, where the identified objects are of the same object type. Computer software application 102 may be any type of software application that may be statically analyzed, such as by a static analysis engine 104, including a desktop application or a web application having HTML code and JavaScript™ code, and whose instructions may include any aspects of a computer software application that may be statically analyzed, such as source code, object code, declarative statements, data structure definitions, and data objects such as tables. Object identifier 100 is preferably configured to identify those objects where the presence of multiple objects of a particular object type is known to be extraneous to statically analyzing computer software application 102 in accordance with a predefined static analysis specification 106. Thus, for example, where static analysis specification 106 indicates that computer software application 102, in the form of a web application having HTML and JavaScript™ instructions, is to be statically analyzed by performing a static security analysis of the JavaScript™ instructions, the presence of multiple records in an HTML table of country names is extraneous to the static analysis, and thus object identifier 100 identifies objects of the object type "records in a table". Object identifier 100 may be configured to evaluate static analysis specification 106 to determine which object types are extraneous to the static analysis, or this information may be provided to object identifier 100, such as by a human operator. Object identifier 100 may also be configured to identify the objects where they are equivalent to each other with respect to one or more predefined object equivalence characteristics 108. For example, in the case of a JavaScript™ security analysis, objects may be said to be equivalent where the objects

- define the same set of attributes, even if their values are different
- have the same JavaScript™ attribute values (e.g., for onClick, on Load, etc. . . . )
- have the same XPath to the root node in its DOM.

An input reducer 110 is preferably configured to prepare a modified version of the instructions of computer software application 102 in which any of the objects identified by object identifier 100 is omitted. Thus, continuing with the previous example, where object identifier 100 identifies multiple table records as being extraneous to statically analyzing the instructions of computer software application 102 when checking for illegal variable names, input reducer 110 preferably prepares a modified version of the instructions of computer software application 102 in which one or more of the table records are removed, thus reducing the size of the computer software application 102 before it is input to static analysis engine 104. Static analysis engine 104 is preferably configured in accordance with conventional techniques to construct a model representation of the modified version of the instructions of computer software application 102, and statically analyze the model representation of the modified version of the instructions.

Any of the elements shown in FIG. 1 are preferably implemented by one or more computers, such as a computer 112, by implementing any of the elements shown in FIG. 1 in computer hardware and/or in computer software embodied in a non-transient, computer-readable medium in accordance with conventional techniques.

Figure 2:
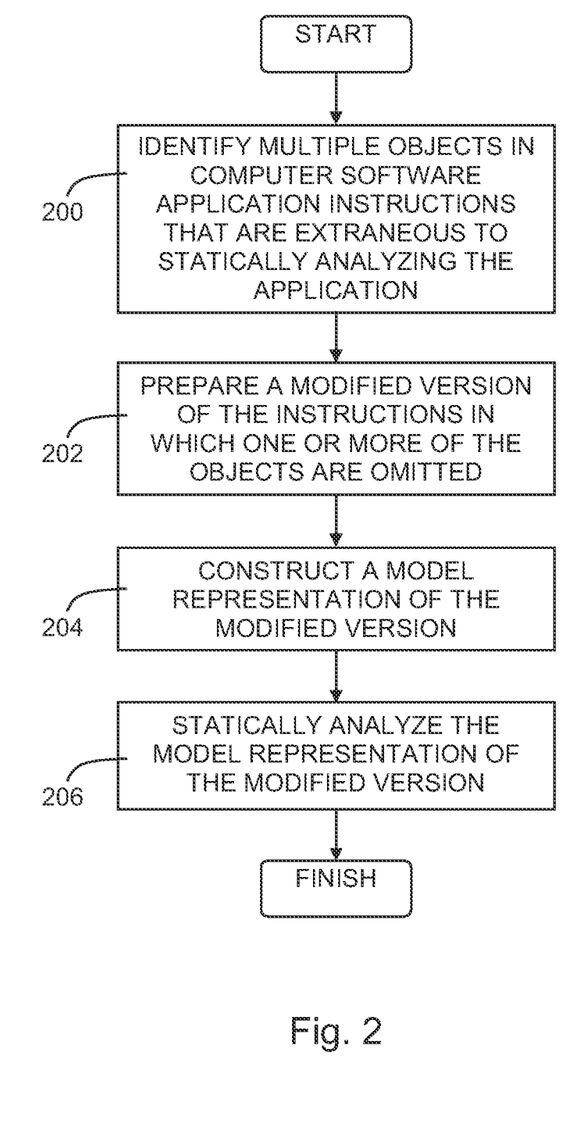
FIG. 2 is a simplified flowchart illustration of an exemplary method of operation of the system of FIG. 1, operative in accordance with an embodiment of the invention.

Reference is now made to FIG. 2 which is a simplified flowchart illustration of an exemplary method of operation of the system of FIG. 1, operative in accordance with an embodiment of the invention. In the method of FIG. 2, multiple objects are identified within the instructions of a computer software application, where the identified objects are of the same object type, and preferably where the presence of the multiple objects is known to be extraneous to statically analyzing the computer software application in accordance with a predefined static analysis specification (step 200). A modified version is prepared of the instructions of the computer software application in which any of the identified objects is omitted (step 202). A model representation is constructed of the modified version of the instructions of computer software application (step 204). The model representation of the modified version of the instructions is statically analyzed (step 206).

Reference is now made to FIGS. 3A and 3B which, taken together, is a simplified listing of HTML and JavaScript™ instructions of an exemplary computer software application before application of the method of FIG. 2, and additionally to FIG. 4 which is a simplified listing of the instructions of FIGS. 3A and 3B after the application of the method of FIG. 2 given a static analysis specification that indicates that the computer software application is to be statically analyzed by performing a static security analysis of the JavaScript™ instructions. Thus, the presence of multiple records in the HTML table shown in FIGS. 3A and 3B is extraneous to the static analysis, and therefore one or more of the table records are omitted from the modified version of instructions shown in FIG. 4, where the modified version is then statically analyzed.

Figure 5:
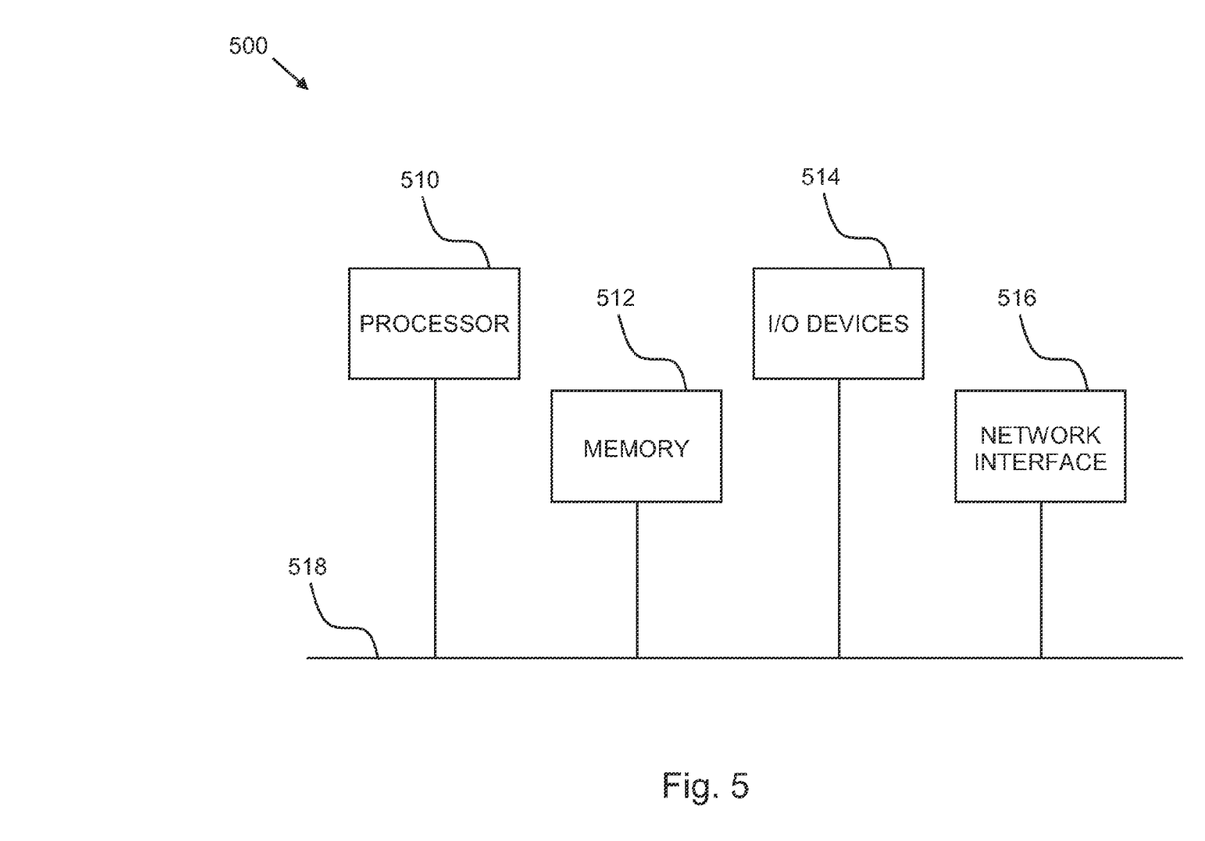
FIG. 5 is a simplified block diagram illustration of an exemplary hardware implementation of a computing system, constructed and operative in accordance with an embodiment of the invention.

Referring now to FIG. 5, block diagram 500 illustrates an exemplary hardware implementation of a computing system in accordance with which one or more components/methodologies of the invention (e.g., components/methodologies described in the context of FIGS. 1-2) may be implemented, according to an embodiment of the invention.

As shown, the techniques for controlling access to at least one resource may be implemented in accordance with a processor 510, a memory 512, I/O devices 514, and a network interface 516, coupled via a computer bus 518 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The flowchart and block diagrams in the Figures illustrate the architecture, functionality, and operation of possible implementations of systems, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that any of the elements described hereinabove may be implemented as a computer program product embodied in a computer-readable medium, such as in the form of computer program instructions stored on magnetic or optical storage media or embedded within computer hardware, and may be executed by or otherwise accessible to a computer.

While the methods and apparatus herein may or may not have been described with reference to specific computer hardware or software, it is appreciated that the methods and apparatus described herein may be readily implemented in computer hardware or software using conventional techniques.

While the invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A computer-implemented method for statically analyzing a computer software application, comprising:
    evaluating, by an object identifier module, a static analysis specification that indicates a static analysis type to be performed and a particular object type previously-identified to be extraneous based upon the static analysis type to determine the static analysis type and the particular object type,
    identifying, by an object identifier module, within the computer software application a plurality of objects of the particular object type previously-identified to be extraneous to a static analysis of the static analysis type to be performed;
preparing, by an input reducer module, a modified version of the computer software application in which the plurality of objects are omitted from the computer software application;
constructing a model representation of the modified version of the computer software application;
and performing, by the static analysis engine, the static analysis on the model representation of the modified version of the computer software application.

2. The method of claim 1, wherein the type of the static analysis is a static security analysis.

3. The method of claim 1, wherein the plurality of objects of the particular object type are identified based upon a comparison with predefined object equivalence characteristics.

4. The method of claim 3, wherein the comparison determines equivalence based upon objects defining a same set of attributes.

5. The method of claim 3, wherein the comparison determines equivalence based upon objects having same JavaScript attributes values.

6. The method of claim 3, wherein the comparison determines equivalence based upon objects having same XPath to a root node in a document object model.

7. A computer hardware system configured for statically analyzing a computer software application, comprising:
    a hardware processor configured to initiate the following executable operations:
        evaluating, by an object identifier module, a static analysis specification that indicates a static analysis type to be performed and a particular object type previously-identified to be extraneous based upon the static analysis type to determine the static analysis type and the particular object type,
        identifying, by an object identifier module, within the computer software application a plurality of objects of the particular object type previously-identified to be extraneous to a static analysis of the static analysis type to be performed;
        preparing, by an input reducer module, a modified version of the computer software application in which the plurality of objects are omitted from the computer software application; constructing a model representation of the modified version of the computer software application;

and performing, by the static analysis engine, the static analysis on the model representation of the modified version of the computer software application.

8. The system of claim 7, wherein the type of the static analysis is a static security analysis.

9. The system of claim 7, wherein the plurality of objects of the particular object type are identified based upon a comparison with predefined object equivalence characteristics.

10. The system of claim 9, wherein the comparison determines equivalence based upon objects defining a same set of attributes.

11. The system of claim 9, wherein the comparison determines equivalence based upon objects having same JavaScript attributes values.

12. The system of claim 9, wherein the comparison determines equivalence based upon objects having same XPath to a root node in a document object model.

13. A computer program product, comprising:
a hardware storage device having program code stored thereon, the program code, which when executed by a computer hardware system configured for statically analyzing a computer software application, causes the computer hardware system to perform:
evaluating, by an object identifier module, a static analysis specification that indicates a static analysis type to be performed and a particular object type previously-identified to be extraneous based upon the static analysis type to determine the static analysis type and the particular object type,
identifying, by an object identifier module, within the computer software application a plurality of objects of the particular object type previously-identified to be extraneous to a static analysis to be performed;
preparing, by an input reducer module, a modified version of the computer software application in which the plurality of objects are omitted from the computer software application;
constructing a model representation of the modified version of the computer software application; and
performing, by the static analysis engine, the static analysis on the model representation of the modified version of the computer software application.

14. The computer program product of claim 13, wherein the type of the static analysis is a static security analysis.

15. The computer program product of claim 13, wherein the plurality of objects of the particular object type are identified based upon a comparison with predefined object equivalence characteristics.

16. The computer program product of claim 15, wherein the comparison determines equivalence based upon objects defining a same set of attributes.

17. The computer program product of claim 15, wherein the comparison determines equivalence based upon objects having same JavaScript attributes values.

18. The computer program product of claim 15, wherein the comparison determines equivalence based upon objects having same XPath to a root node in a document object model.

* * * * *